CHARLES G. McILWRAITH
KERRY E. COUGHLIN
INVENTORS
BY Carl R. Brown
ATTORNEY
Alfons Valukonis
AGENT CHARLES G. McILWRAITH
KERRY E. COUGHLIN
INVENTORS
BY Carl R. Brown
ATTORNEY
Alfons Valukonis
AGENT CHARLES G. McILWRAITH
KERRY E. COUGHLIN
INVENTORS BY Carl R. Brown
ATTORNEY Alfons Valukonis
AGENT CHARLES G. McILWRAITH
KERRY E. COUGHLIN
INVENTORS BY Carl R. Brown
ATTORNEY
Alfons Valukonis
AGENT

3,289,152
ACOUSTIC SIGNALING SYSTEM

Charles G. McIlwraith, Rancho Sante Fe, and Kerry E. Coughlin, Solana Beach, Calif., assignors to General Dynamics Corporation, San Diego, Calif., a corporation of Delaware Filed Feb. 6, 1964, Ser. No. 343,064
5 Claims. (Cl. 340—5)

This invention relates generally to a system for the transmission and reception of information through a highly attenuating medium, and more particularly, to a communications system for transmitting and receiving information through water with a high degree of reliability and security.

The communications system of the present invention comprises transmitter means which transmits information containing a plurality of different frequency signals through a medium. Some of the signals represent the "zero" and "one" bits of a binary coded message and are spaced by other signals representing timing bits. Receiver means is provided which is responsive to the different frequency signals and which generates a utilization signal for actuating a device.

Accordingly, one object of the present invention is to provide a signaling system.

It is another object of this invention to provide a signaling system which is reliable and provides a great measure of security.

Another object of the invention is the provision of a pulse communications system which is capable of sending and receiving messages through a highly attenuating medium, such as water, with great reliability and security.

These and various other objects and features of the invention will be more clearly understood from a reading of the detailed description in conjunction with the drawings, in which.

Figure 1:
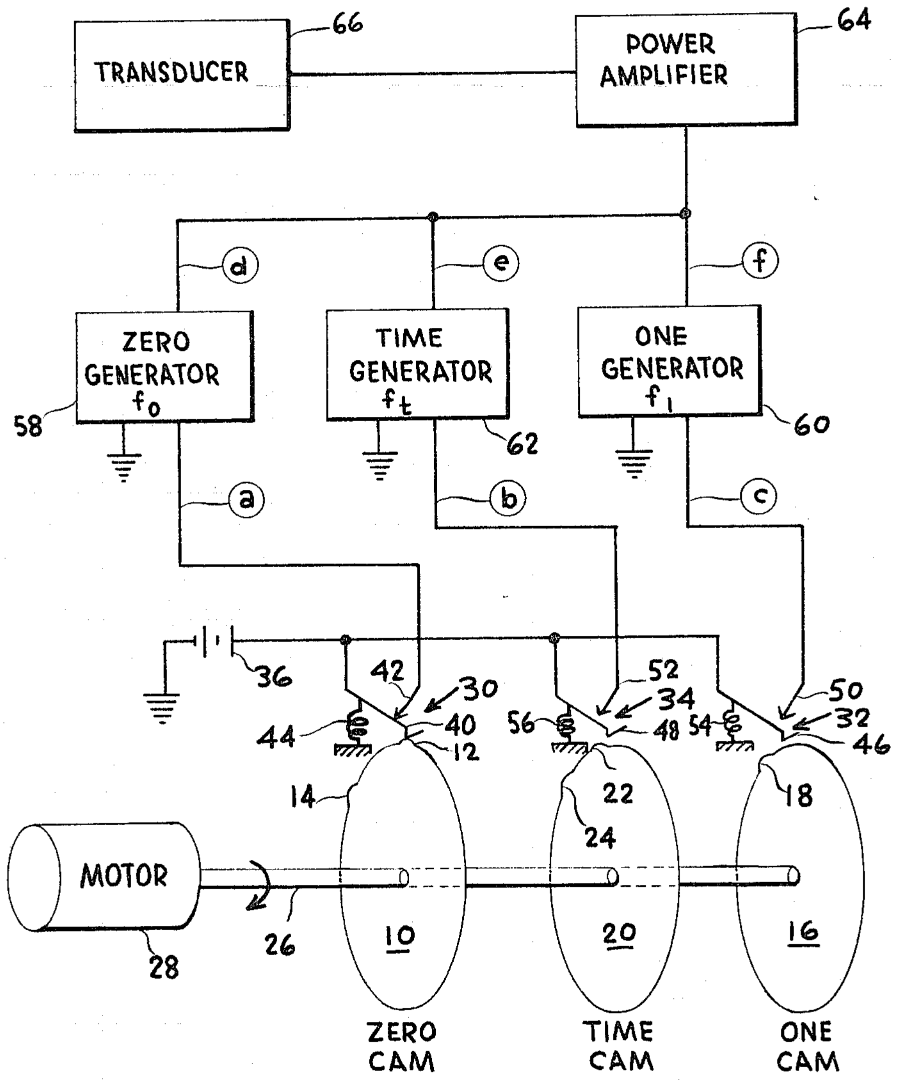
FIGURE 1 is a block and pictorial showing of the transmitter portion of the communications system of the present invention.

Referring now to the drawings and particularly to FIGURE 1, there is depicted the transmitter portion of the present invention for transmitting through a medium information containing a plurality of different frequency signals, a pair of the signals representing the bits of a binary coded message and spaced by other signals representing timing bits. The transmitter consists of information storage means which includes a cam 10 having lobes 12 and 14 serving as a means for storing the "zero" bits of the binary coded message. A cam 16, carrying a lobe 18, is used to store the "one" bits of the message. A cam 20 has lobes 22 and 24 and provides for the storage of the timing bits. Assume that it is desired to store information containing the binary coded message having the "zero" and "one" bits 010 in that order, and spaced by timing bits. Accordingly, the zero cam 10 is provided with lobes 12 and 14, as shown in FIGURE 1, representing the first and second "zero" bits of the message respectively. The one cam 16 is provided with the single lobe 18 to represent the "one" bit of the message. Similarly, the time cam 20 is provided with lobes 22 and 24 to represent the timing bits separating the first and second "zero" bits and the single "one" bit, respectively. The cams 10, 16, and 20 are secured to a shaft 26 such that rotation of the shaft 26 by a constant speed motor 28 allows the lobes of cams 10, 16 and 20 to strike the movable contact of associated pairs of contacts 30, 32 and 34 in the following order: 12, 22, 18, 24 and 14, as will hereinafter be more fully set forth.

Means for releasing the stored information includes the motor 28 for rotating the shaft 26, the pairs of normally open contacts 30, 32 and 34, and an energy source in the form of a battery 36.

The pair of contacts 30 includes a movable contact 40 normally restrained from engagement with stationary contact 42 by means of spring 44, but adapted to engage the stationary contact upon being struck by one of the rotating lobes 12 or 14 of cam 10. Likewise the pairs of contacts 32 and 34 include movable contacts 46 and 48, respectively, which are normally restrained from contact with respective associated stationary contacts 50 and 52 by means of springs 54 and 56. The movable contact 46 is adapted to be struck by the lobe 18 of cam 16 as it rotates to make contact with the stationary contact 50. Similarly the movable contact 48 is struck by the lobes 22 and 24 of cam 20 to make contact with its stationary contact 52.

Movable contacts 44, 46 and 48 are each electrically connected to one terminal of the battery 36, the other terminal of the energy source being connected to ground. Stationary contacts 42, 50 and 52 are connected to one power input terminal of signal generators 58, 60 and 62, respectively. The other input terminals of the signal generators are each connected to ground. Closing of the movable contacts by the associated cam lobes generates power pulses, as shown by waveforms (*a*) to (*c*) of FIGURE 2.

Figure 2:
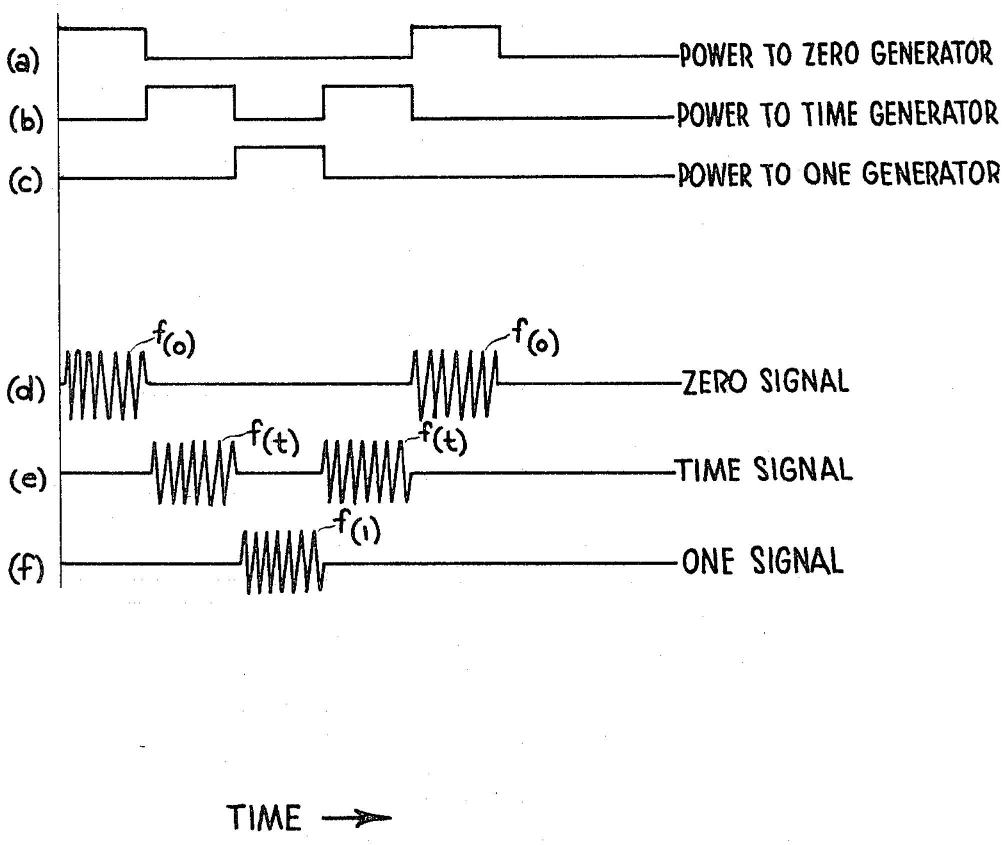
FIGURE 2 is a time graph showing the time relationships between various signals in the transmitter of FIGURE 1.

The signal generators 58, 60, and 62 are each constructed to generate in its output a signal of a predetermined frequency when supplied by a power pulse from source 36, and constitute the means by which different frequency carrier signals, as shown in waveforms (*d*) to (*e*) of FIGURE 2, are generated to represent the bits of the binary coded message and the timing bits. Specifically, each generator is energized or "turned on" by a power pulse resulting from the closing of an associated one of the pairs of contacts 30, 32, and 34. The generator 58 generates first frequency carrier signals $f(0)$ that represent the "zero" bits of the message. Generator 60 generates second frequency carrier signals $f(1)$ representing the "one" bits of the message, and the generator 62 generates third frequency carrier signals $f(t)$ representing the timing bits.

The output of the generators 58, 60 and 62 are channeled in parallel through a power amplifier 64 to a transducer 66 of suitable construction to be immersed in water to radiate the generated information therein.

Figure 3:
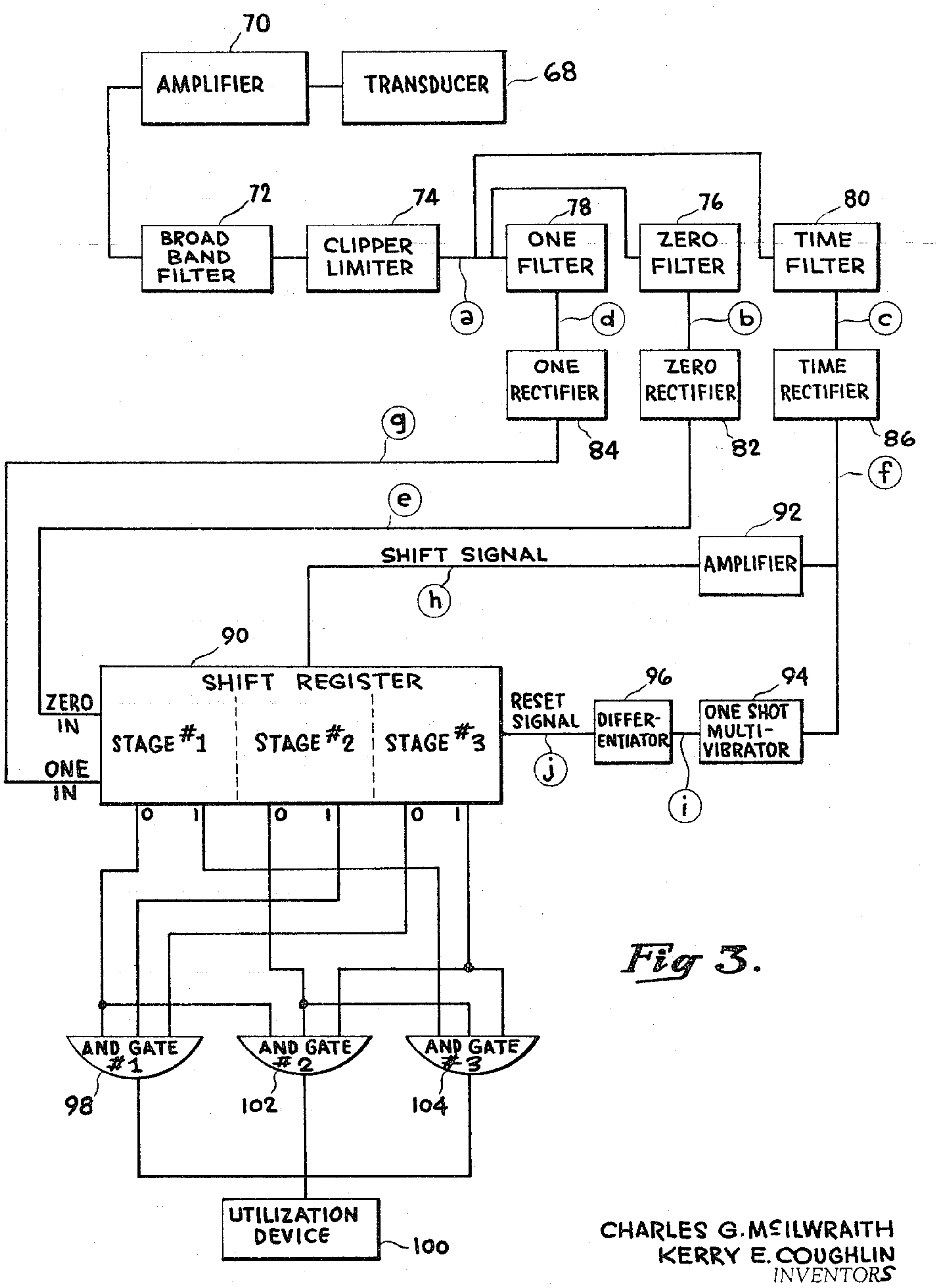
FIGURE 3 is a block diagram of the receiver portion of the communications system of the present invention.

Referring now to FIGURE 3, wherein there is disclosed the receiver portion of the system of the present invention, there is revealed a transducer 68 adapted to be submerged in a medium such as water. The transducer 68 is preferably of the barium titanate type and serves to detect information signals transmitted by the transmitter portion of FIGURE 1. The information signals are routed to a suitable conventional amplifier 70 for amplification thereby. The amplifier 70 is followed by a broad band filter 72 which passes only the band of information signals containing the frequencies $f(0)$, $f(1)$ and $f(t)$ and rejects all other frequencies. The information signals are then routed through a clipper-limiter 74 to provide in its output constant amplitude information signals for any level of input information signals above a predetermined threshold level, as shown by the waveform (*a*) of FIGURE 4. From the clipper-limiter 74 the signals are fed in parallel to narrow band filters 76, 78 and 80, which separate respectively the "zero" signal $f(0)$, the "one" signal $f(1)$ and the timing signal $f(t)$, as shown in the waveforms (*b*) to (*d*) of FIGURE 4. These signals are separately rectified by the rectifiers 82, 84, and 86 to provide waveforms (*e*) to (*g*) of FIGURE 4.

The waveforms (*e*) and (*g*) are applied to the "zero" and "one" input terminals of a three stage binary shift register 90 which is provided for the serial storing of the binary coded message bits. For this purpose the shift register 90 could be of any conventional design, requiring only that the register be provided with the above mentioned input terminals for the serial acceptance of the "zero" and "one" bits of a binary coded message, and also with input terminals for applying separate signals to shift the register to serially store the binary coded message, and to reset or clear the register of a stored message and prepare it for the storing of another message. A suitable form of register is disclosed and described in "Computer Handbook," first edition 1962, pages 16–21, Figure 16.21, edited by Huskey and Korn, and published by McGraw-Hill Book Company. It is to be understood that the shift register 90 can have three stages, as shown, or more, the number of stages depending on the number of binary message bits to be stored.

Figure 4:
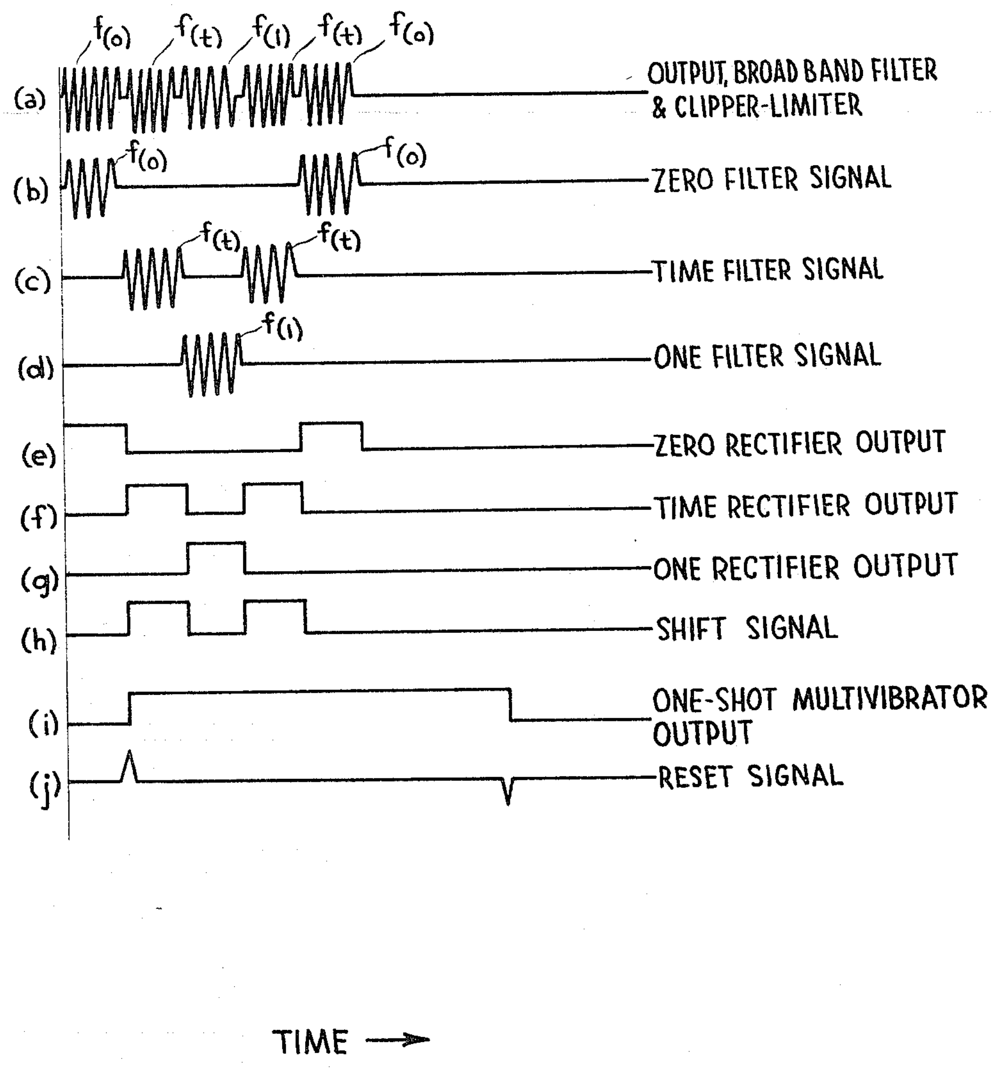
FIGURE 4 is a time graph showing the time relationships between various signals in the receiver of FIGURE 3.

An amplifier 92 amplifies the timing pulses (*f*) of FIGURE 4 and produces in its output a waveform (*h*) which is applied to the shift terminal of the register 90.

A one-shot multivibrator 94, which is triggered by the timing pulses (*f*), has a square wave (*i*) output if a time duration determined by the RC time constant of the multivibrator. The time duration of wave (*i*) is adjusted so that it is greater than the duration of the waveform (*a*) and less than the interval between the end of one wave form (*a*) and the beginning of another. The square wave (*i*) is differentiated by differentiation circuit 96 to produce a pulse (*j*) which is applied to the reset terminal of the binary shift register 90. The shift register 90 will reset itself only upon receiving a negative pulse reset signal (see FIG. 4(*j*)).

Storing of the binary coded message 010 in the shift register 90 is accomplished as follows: When the first "zero" pulse of the waveform (*e*) appears it is channeled to the "zero" input connection of stage #1 of the shift register 90, and therein enttered. Next, upon the appearance of the first timing pulse of waveform (*h*), which is applied to the shift terminals of the register 90, there develops a shifting of the "zero" bit entered into stage #1 one stage to the right to stage #2, leaving stage #1 empty and ready to receive the next pulse to be entered. The next pulse to appear is the single "one" pulse of waveform (*g*) which is applied to the "one" input connection of stage #1. Appearance of the second timing pulse of the waveform (*h*) serves to shift the register 90 so that the "zero" bit in stage #2 is shifted to stage #3 and the "one" bit in stage #1 is shifted to stage #2. The last pulse of waveform (*e*), which represents a "zero" bit, is applied to the "zero" input connection of stage #1 and is entered therein. With the storing of the last message bit in the register 90, there is developed a plurality of output signals at the "zero," "one," and "zero" output connections of stages #1, #2, and #3, respectively, to represent the stored binary coded message 010.

A conventional "and" gate 98 and one input connection to the "zero" output connection of stage #1 and the other two input connections to the "one" and "zero" output connections of stages #2 and #3 of the shift register 90, respectively. The gate 98 serves to provide a single output or utilization signal to actuate a utilization device 100 upon the simultaneous appearance of output signals at the "zero," "one," and "zero" output connections of stages #1, #2 and #3, respectively, as set forth above. Similar gates 102 and 103 are provided for producing outputs to the utilization device 100, but have their input connections differently connected to the output connections of the stages of the shift register 90 so as to be responsive to different combinations of output signals from the three stages. As shown, the gate 102 has two input connections to the "zero" output connections of stages #1 and #2 and the other input connection to the "one" output connection of stage #3. Similarly, the gate 104 has one input connection to the "one" output connection of stage #1, another input connection to the "zero" output connection of stage #2, and a last input connection to the "one" output connection of stage #3. The gate 102 provides a utilization signal to actuate the utilization device 100 upon the simultaneous appearance of output signals at the "zero," "zero," and "one" output connections of stages #1, #2 and #3, respectively, when the binary message 100 is stored by the shift register 90. Similarly, a single output or utilization signal is produced by the gate 104 to actuate the device 100 upon the simultaneous appearance of output signals at the "one," "zero," and "one," output connections of stages #1, #2 and #3, respectively, when the binary coded message 101 is stored by the shift register 90.

The utilization device 100 is not shown or described in detail, since it may be of any desired form, it being only required to respond to the utilization signals produced by the gates 98, 100 and 102.

When the end of a given information message has been reached, but before the start of the next transmission, the reset signal (*j*) of FIGURE 4 is applied to the shift terminal of register 90 to reset or clear the register 90 of any stored message, thus setting each stage of the register in preparation for serially storing the next transmitted message in a manner comparable to that hereinbefore set forth.

While a specific embodiment of the invention has been illustrated and described, it is to be understood that various modifications may be made without departing from the invention as set forth in the appended claims.

What we claim is:

1. A communications system comprising
means for transmitting through a medium information containing a plurality of different frequency signals, a pair of said signals representing the bits of a binary coded message and spaced by another of said signals representing timing bits
means for separating said plurality of signals
binary shift register means for storing said pair of signals representing the bits of the binary coded message, said signals representing timing bits being applied to shift said register means to serially store said pair of signals
means responsive to said stored pair of signals for generating a signal to actuate a device,
means responsive to said signals representing timing bits for generating a pulse having a duration greater than the duration of said information
and means for differentiating said pulse to provide a reset signal to said register means to clear therefrom said stored pair of signals.

2. A communications system comprising
means for transmitting through a medium information containing a plurality of different frequency signals, a pair of said signals representing the bits of a binary coded message and spaced by another of said signals representing timing bits
filter means for separating said plurality of signals
binary shift register means for storing said pair of signals representing the bits of the binary coded message, said signals representing timing bits being applied to shift said register means to serially store said pair of signals
gate means responsive to said stored pair of signals for generating a signal to actuate a device, and
means responsive to said signals representing timing bits for generating a negative signal to reset said register means to clear therefrom said stored pair of signals.

3. A communications system comprising means for transmitting through a medium information containing a plurality of different frequency signals, a pair of said signals representing the bits of a binary coded message and spaced by another of said signals representing timing bits filter means for separating said plurality of signals binary shift register means for storing said pair of signals representing the bits of the binary coded message, said signals representing timing bits being applied to shift said register means to serially store said pair of signals gate means responsive to said stored pair of signals for generating a signal to actuate a device and means responsive to said signals representing timing bits for generating a signal to reset said register means to clear therefrom said stored pair of signals.

4. A communications system comprising means for transmitting through a medium information containing a plurality of different frequency signals, a pair of said signals representing the bits of a binary coded message and spaced by another of said signals representing timing bits filter means for separating said plurality of signals binary shift register means for storing said pair of signals representing the bits of the binary coded message, said signals representing timing bits being applied to shift said register means to serially store said pair of signals gate means responsive to said stored pair of signals for generating a signal to actuate a device means responsive to said signals representing timing bits for generating a pulse having a duration greater than the duration of said information and means for differentiating said pulse to provide a reset signal to said register means to clear therefrom said stored pair of signals.

5. A communications system comprising first, second, and third cams positioned on a shaft for rotation therewith lobes on said first, second, and third cams, the lobes on said first and second cams representing the zero and one bits of a binary coded message, respectively, the lobes on said third cam representing timing bits spacing said zero and one bits first, second, and third pairs of normally opened contacts, one contact of each pair being connected to one terminal of a power source, said contacts being adapted to be closed by the striking of said zero one, and timing lobes, respectively, when rotated means for rotating said shaft first, second, and third different frequency carrier signal generators, each of said generators being adapted to be actuated by the application of power to a pair of input terminals, one terminal of each generator being connected to the other terminal of the power source and each other terminal of said first, second, and third generators being connected to one of the other contacts of said first, second, and third pairs of contacts, respectively first transducer means connected to said first, second, and third generator means for radiating first, second, and third different frequency carrier signals through a medium second transducer means positioned in the medium and responsive to said first, second, and third different frequency carrier signals filter means connected to said second transducer means for separating said first, second, and third different frequency carrier signals binary shift register means for storing said first and second signals, said third signal being applied to shift said register means to serially store said first and second signals gate means responsive to said stored first and second signals for generating a signal to actuate a device means responsive to said third signal for generating a pulse having a duration greater than the duration of said first, second, and third signals and means for differentiating said pulse to provide a reset signal to said register means to clear therefrom said stored pair of signals.

References Cited by the Examiner

UNITED STATES PATENTS

| | | | |
|---|---|---|---|
| 1,829,783 | 11/1931 | Chestnut et al. | 325—33 X |
| 2,427,363 | 9/1947 | Matte | 178—66 |
| 3,069,657 | 12/1962 | Green et al. | 340—171 |
| 3,107,344 | 10/1963 | Baker et al. | 328—37 X |
| 3,219,758 | 11/1965 | Brothman et al. | 179—2 |
| 3,225,348 | 12/1965 | Gilman | 325—30 X |

FOREIGN PATENTS

| | | |
|---|---|---|
| 836,824 | 6/1960 | Great Britain. |

OTHER REFERENCES

IBM Tech. Disclosure Bulletin, vol. 2, No. 4, December 1959, pp. 64 and 65 relied on.

CHESTER L. JUSTUS, *Primary Examiner.*

R. A. FARLEY, *Assistant Examiner.*